(12) United States Patent
Hendershot et al.

(10) Patent No.: US 8,545,213 B2
(45) Date of Patent: Oct. 1, 2013

(54) REFORMER AND METHOD OF OPERATING THE REFORMER

(75) Inventors: Reed Jacob Hendershot, Breinigsville, PA (US); Xianming Jimmy Li, Orefield, PA (US); Aleksandar Georgi Slavejkov, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 867 days.

(21) Appl. No.: 12/720,150

(22) Filed: Mar. 9, 2010

(65) Prior Publication Data

US 2011/0220847 A1 Sep. 15, 2011

(51) Int. Cl.
*B01J 8/06* (2006.01)
*B01J 19/24* (2006.01)
*F23C 5/00* (2006.01)

(52) U.S. Cl.
USPC .................. 431/8; 422/625; 422/659; 431/12

(58) Field of Classification Search
USPC .................. 422/625, 659, 198; 196/110, 116; 252/373; 423/651, 652; 48/94, 127.9; 431/2, 431/8, 10, 12, 174, 178, 179, 181, 202
See application file for complete search history.

(56) References Cited

U.S. PATENT DOCUMENTS

| 4,454,839 A | 6/1984 | Gater et al. |
| 4,945,841 A | 8/1990 | Nakamachi et al. |
| 5,417,564 A | 5/1995 | Briggs |
| 5,690,039 A | 11/1997 | Monro et al. |
| 5,944,503 A | 8/1999 | Van Eerden et al. |
| 5,980,243 A | 11/1999 | Surbey et al. |
| 5,993,193 A | 11/1999 | Loftus et al. |
| 6,176,087 B1 | 1/2001 | Snyder et al. |
| 6,471,508 B1 | 10/2002 | Finke et al. |
| 6,616,442 B2 | 9/2003 | Venizelos et al. |
| 6,773,256 B2 * | 8/2004 | Joshi et al. ................ 431/9 |
| 6,793,486 B2 | 9/2004 | Finke et al. |
| 6,793,700 B2 * | 9/2004 | Pham et al. .............. 422/198 |
| 6,866,503 B2 | 3/2005 | Ladharam |
| 6,979,191 B1 | 12/2005 | Zink et al. |
| 7,531,146 B2 * | 5/2009 | Gorval ...................... 422/625 |
| 7,686,611 B2 * | 3/2010 | Joshi et al. ................ 431/8 |
| 2007/0099141 A1 | 5/2007 | Joshi et al. |

FOREIGN PATENT DOCUMENTS

GB 2071832 A 9/1981

* cited by examiner

*Primary Examiner* — Jill Warden
*Assistant Examiner* — Joye L Woodard
(74) *Attorney, Agent, or Firm* — Bryan C. Hoke, Jr.

(57) ABSTRACT

A method of combustion and a reformer. The method includes combusting a fuel in a combustion region of an up-fired or down-fired reformer and forming non-uniform injection properties with a wall-bound burner. The combusting is performed in a combustion region by burners, wherein at least one of the burners is the wall-bound burner forming the non-uniform injection properties. The non-uniform injection properties generate a heat profile providing a first heat density proximal to a wall and a second heat density distal from the wall, the second heat density being greater than the first heat density. The non-uniform injection properties are formed by injection properties selected from an angle of one or more injectors, a flow rate of one or more injectors, an amount and/or location of oxidant injectors, an amount and/or location of fuel injectors, and combinations thereof.

13 Claims, 3 Drawing Sheets

REFORMER AND METHOD OF OPERATING THE REFORMER

BACKGROUND

In furnaces having multiple rows of burners, such as reforming furnaces or reformers, burners positioned in close proximity to walls and/or corners of the furnace perform differently than burners positioned distal from walls and/or corners of the furnace. Generally, in comparison to burners positioned distal from the walls and/or corners of the furnace, burners positioned in close proximity to walls and/or corners of the furnace interact with the wall of the furnace more and produce greater amounts of NOx.

Great Britain patent GB2071832, which is hereby incorporated by reference in its entirety, discloses a furnace and the operation thereof. Specifically, the GB2071832 patent discloses furnace level air staging in a boiler. Generally, the burners in the boiler are provided with combustion air that is much less than stoichiometric (about 60% to about 80% of stoichiometric), and the remaining combustion air is provided by ports in the furnace away from the boilers. To promote flame stability, some of the burners are provided with combustion air that is stoichiometric in order to stabilize surrounding flames. For example, burners positioned at the end of a row can be provided with combustion air being up to 100% stoichiometric. Providing the burners positioned at the end of the row with combustion air that is 100% stoichiometric increases the flame temperature proximal to the burners at the end of the row. Such increase in temperature results in more heat interacting with the wall of the furnace, thereby producing more nitrogen oxides (NOx).

U.S. Pat. No. 4,454,839, which is hereby incorporated by reference in its entirety, discloses a furnace. Specifically, the U.S. Pat. No. 4,454,839 discloses a burner arrangement and flame orientation to control gas currents within an ethylene cracker. The U.S. Pat. No. 4,454,839 discloses using an aerodynamic pattern associated with combustion gases to achieve a stable flame pattern, decreased flame impingement on process tubes, and increased mixing. Being related to an ethylene cracker, which includes all burners being positioned close to walls, the U.S. Pat. No. 4,454,839 fails to disclose any distinction between burners proximal to walls and burners distal from walls.

U.S. Pat. No. 5,690,039, which is hereby incorporated by reference in its entirety, discloses a method and apparatus for reducing the production of NOx using spatially selective cooling. In the U.S. Pat. No. 5,690,039, a cooling fluid is used to selectively cool regions of high NOx generation, thereby reducing NOx generation. Use of the cooling fluid results in capital expense associated equipment providing the cooling fluid and associated with including the appropriate configurations for the furnace. Also, using the cooling fluid reduces efficiency by reducing the percent of the total heat produced from the fuel combustion that is absorbed by the process.

What is needed is a method and combustion system generating low NOx emissions having low capital expenses, high efficiency, and/or low furnace-burner interaction.

BRIEF SUMMARY

The present invention is directed to a method of operating a reformer and the reformer. More specifically, the present invention relates to forming non-uniform injection properties to improve operation of the reformer.

One aspect of the present disclosure includes a method of combustion and the reformer performing the method. The method includes combusting a fuel in a combustion region of an up-fired or down-fired reformer and forming non-uniform injection properties with a wall-bound burner. Non-uniform injection properties are injection properties that are non-uniform. The combustion region is at least partially surrounded by one or more walls. The combusting is performed by the plurality of burners, wherein at least one of the plurality of burners is the wall-bound burner and at least one of the plurality of burners is a non-wall-bound burner. Non-uniform injection properties are formed by the wall-bound burner. The non-uniform injection properties generate a heat profile that provides a second heat density distal from the one or more walls that is greater than a first heat density proximal to the one or more walls. One or more injection properties of the wall-bound burner are different from one or more injection properties of the non-wall-bound burner. The non-uniform injection properties of the wall-bound burner are formed by the one or more injection properties of the wall-bound burner. The one or more injection properties of the wall-bound burner and the non-wall-bound burner are selected from the group consisting of an angle of one or more injectors, a flow through one or more injectors, an amount and/or location of oxidant injectors, an amount and/or location of fuel injectors, and combinations thereof. As used herein, the phrase "amount and/or location" refers to the amount, the location, or the amount and location.

One or more embodiments of the present disclosure include the non-uniform properties being formed by the flow through one or more injectors, the flow through one or more injectors comprising a first fluid flow from a first set of injectors of the wall-bound burner and a second fluid flow from a second set of injectors of the wall-bound burner. The first set of injectors is proximal to the wall and the second set of injectors is distal from the wall. Further embodiments include the first fluid flow differing from the second fluid flow by composition, the first fluid flow comprising a fuel, the first fluid flow having a first fuel-to-oxidant ratio that is less than a second fuel-to-oxidant ratio of the second fluid flow, the first fluid flow comprising an oxidant, the first fluid flow having a first flow rate that is lower than a second flow rate of the second fluid flow, the first flow rate being zero, and/or the angle of one or more injectors comprising a first injector angle for a first set of injectors that is different from a second injector angle for a second set of injectors. Other embodiments can include the burners being arranged in a plurality of rows, the non-uniform injection properties reducing NOx generation in the reformer and decreasing flame volume in the combustion region, the amount of oxidant injectors in the wall-bound burner differing from a second amount of oxidant injectors in a non-wall-bound burner, the amount of fuel injectors in the wall-bound burner differing from a second amount of fuel injectors in a non-wall-bound burner, and/or the wall-bound burner being in a rotated position with respect to a non-wall-bound burner. Another embodiment includes a reformer configured for the disclosed methods.

One or more embodiments of the present disclosure include the non-uniform properties being formed by the flow through one or more injectors, the flow through one or more injectors comprising a first fluid flow from a first set of injectors of the wall-bound burner and a second fluid flow from a second set of injectors of the wall-bound burner. The first set of injectors is proximal to the wall and the second set of injectors is distal from the wall. Further embodiments include the first fluid flow differing from the second fluid flow by composition, the first fluid flow comprising a fuel, the first fluid flow having a first fuel-to-oxidant ratio that is less than a second fuel-to-oxidant ratio of the second fluid flow, the first fluid flow comprising an oxidant, the first fluid flow having a first flow rate that is lower than a second flow rate of the second fluid flow, the first flow rate being zero, and/or the angle of one or more injectors comprising a first injector angle for a first set of injectors that is different from a second injector angle for a second set of injectors. Other embodiments can include the burners being arranged in a plurality of rows, the non-uniform injection properties reducing NOx generation in the reformer and decreasing flame volume in the combustion region, the amount of oxidant injectors in the wall-bound burner differing from a second amount of oxidant injectors in a non-wall-bound burner, the amount of fuel injectors in the wall-bound burner differing from a second amount of fuel injectors in a non-wall-bound burner, and/or the wall-bound burner being in a rotated position with respect to the non-wall-bound burner. Another embodiment includes a reformer configured for the disclosed methods.

Another aspect of the present disclosure includes a reformer including a combustion region at least partially surrounded by one or more walls and a plurality of burners in an up-fired or down-fired configuration, each burner of the plurality of burners including a plurality of injectors. At least one burner of the plurality of burners is a wall-bound burner and at least one burner of the plurality of burners is a non-wall-bound burner. The wall-bound burner includes non-uniform injection properties for generating a heat profile, the heat profile providing a first heat density proximal to the one or more walls and a second heat density distal from the one or more walls, the second heat density being greater than the first heat density. One or more injection properties of the wall-bound burner are different from one or more injection properties of the non-wall-bound burner. The non-uniform injection properties of the wall-bound burner are formed by the one or more injection properaties of the wall-bound burner. The one or more injection properties of the wall-bound burner and the non-wall-bound burner are selected from the group consisting of an angle of one or more injectors, a flow through one or more injectors, an amount of oxidant injectors, an amount of fuel injectors, and combinations thereof, for each of the wall-bound burner and the non-wall-bound burner, respectively.

Non-uniform injection properties of the wall-bound burner may be formed by the angle of one or more injectors of the wall-bound burner, the angle of one or more injectors comprising a first injector angle for a first set of injectors differing from a second injector angle for a second set of injectors where the first injector angle is different than the second injector angle.

Another embodiment includes a method of combusting by using the disclosed reformer.

An advantage of the present method and/or reformer includes lower capital expenses with equal or increased NOx reduction.

Another advantage of the present method and/or reformer includes increased efficiency by improved flame control.

Another advantage of the present method and/or reformer includes decreased burner interaction with the wall of the reformer.

There are several aspects of the invention as outlined below.

Aspect #1. A method of combustion, the method comprising:
combusting a fuel in a combustion region of an up-fired or down-fired reformer, the combustion region being at least partially surrounded by one or more walls, the combusting being performed by a plurality of burners, wherein at least one of the plurality of burners is a wall-bound burner and at least one of the plurality of burners is a non-wall-bound burner; and
forming non-uniform injection properties with the wall-bound burner, the non-uniform injection properties generating a heat profile, the heat profile providing a first heat density proximal to the one or more walls and a second heat density distal from the one or more walls, the second heat density being greater than the first heat density;
wherein one or more injection properties of the wall-bound burner are different from one or more injection properties of the non-wall-bound burner, and wherein the non-uniform injection properties of the wall-bound burner are formed by the one or more injection properties of the wall-bound burner, the one or more injection properties of the wall-bound burner and the non-wall-bound burner being selected from the group consisting of an angle of one or more injectors, a flow through one or more injectors, an amount and/or location of oxidant injectors, an amount and/or location of fuel injectors, and combinations thereof.

Aspect #2. A method as defined in aspect #1, wherein the non-uniform injection properties are formed by the flow through one or more injectors, the flow through one or more injectors comprising a first fluid flow from a first set of injectors of the wall-bound burner and a second fluid flow from a second set of injectors of the wall-bound burner, the first set of injectors being proximal to the one or more walls and the second set of injectors being distal from the one or more walls.

Aspect #3. A method as defined in aspect #2, wherein the first fluid flow differs from the second fluid flow by composition.

Aspect #4. A method as defined in aspect #2 or #3, wherein the first fluid flow comprises a fuel.

Aspect #5. A method as defined in any one of aspects #2 to #4, wherein the first fluid flow has a first fuel-to-oxidant ratio and the second fluid flow has a second fuel-to-oxidant ratio, the first fuel-to-oxidant ratio being less than the second fuel-to-oxidant ratio.

Aspect #6. A method as defined in any one of aspects #2 to #3, wherein the first fluid flow comprises an oxidant.

Aspect #7. A method as defined in aspect #6, wherein the first fluid flow includes a lower fuel-to-oxidant ratio than the second fluid flow.

Aspect #8. A method as defined in any one of aspects #2 to #5 wherein the first fluid flow has a first flow rate and the second fluid flow has a second flow rate, the first flow rate being different from the second flow rate.

Aspect #9. A method as defined in aspect #8, wherein the first flow rate is zero.

Aspect #10. A method as defined in any one of aspects #1 to #9, wherein the non-uniform injection properties are formed by the angle of one or more injectors, the angle of one or more injectors comprising a first injector angle for a first set of injectors and a second injector angle for a second set of injectors, the first injector angle being different from the second injector angle.

Aspect #11. A method as defined in any one of aspects #1 to #10, wherein the plurality of burners are arranged in a plurality of rows.

Aspect #12. A method as defined in any one of aspects #1 to #11, wherein the forming of the non-uniform injection properties reduces NOx generation in the up-fired or down-fired reformer and decreases flame volume in the combustion region.

Aspect #13. A method as defined in any one of aspects #1 to #12, wherein the amount of oxidant injectors in the wall-bound burner differs from a second amount of oxidant injectors in the non-wall-bound burner.

Aspect #14. A method as defined in any one of aspects #1 to #13, wherein the amount of fuel injectors in the wall-bound burner differs from a second amount of fuel injectors in the non-wall-bound burner.

Aspect #15. A method as define in any one of aspects #1 to #14, wherein the wall-bound burner includes a rotated position with respect to the non-wall-bound burner.

Aspect #16. A reformer configured for performing a method as defined in any one of aspects #1 to #15, the reformer comprising the combustion region and the plurality of burners.

Aspect #17. A reformer, the reformer comprising:
a combustion region at least partially surrounded by one or more walls;
a plurality of burners in an up-fired or down-fired configuration, each burner of the plurality of burners including a plurality of injectors;
wherein at least one burner of the plurality of burners is a wall-bound burner and at least one burner of the plurality of burners is a non-wall-bound burner;
wherein the wall-bound burner includes non-uniform injection properties for generating a heat profile, the heat profile providing a first heat density proximal to the one or more walls and a second heat density distal from the one or more walls, the second heat density being greater than the first heat density;
wherein one or more injection properties of the wall-bound burner are different from one or more injection properties of the non-wall-bound burner; and
wherein the non-uniform injection properties of the wall-bound burner are formed by the one or more injection properties of the wall-bound burner, the one or more injection properties of the wall-bound burner and the non-wall-bound burner being selected from the group consisting of an angle of one or more injectors, a flow through one or more injectors, an amount and/or location of oxidant injectors, an amount and/or location of fuel injectors, and combinations thereof.

Aspect #18. A reformer as defined in aspect #17, wherein the non-uniform injection properties of the wall-bound burner are formed by the angle of one or more injectors of the wall-bound burner, the angle of one or more injectors comprising a first injector angle for a first set of injectors and a second injector angle for a second set of injectors, the first injector angle being different from the second injector angle.

Aspect #19. A method of combusting in a reformer as defined in aspects #17 or #18, the method comprising combusting a fuel in the combustion region and forming non-uniform injection properties with the wall-bound burner.

Other features and advantages of the present method and/or reformer will be apparent from the following more detailed description of the preferred embodiment, taken in conjunction with the accompanying drawings which illustrate, by way of example, the principles of the invention.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

Provided is a method of operating a reformer and the reformer. As defined herein, a reformer is any furnace containing tubular reactors wherein a feedstock containing elemental hydrogen and elemental carbon (i.e. a hydrocarbon) is converted to synthesis gas (CO and $H_2$) by reaction with steam over a catalyst. In the method and the reformer, non-uniform injection properties improve operation of the reformer. Embodiments of the method and the reformer can involve low capital expenses, high efficiency, produce a disproportionate impact on flame interaction, and/or little or no burner interaction with a reformer wall by including non-uniform injection properties relating to the selective and/or controlled injection of fuel, air, and/or other fluids. The non-uniform injection properties can reduce furnace instabilities and reduce the production of furnace NOx to better match the flames from a given burner with the available combustion space. For example, the operation can control gas flow to reduce or eliminate burner interaction with the reformer wall and reduce or eliminate localized overheating.

Figure 1:
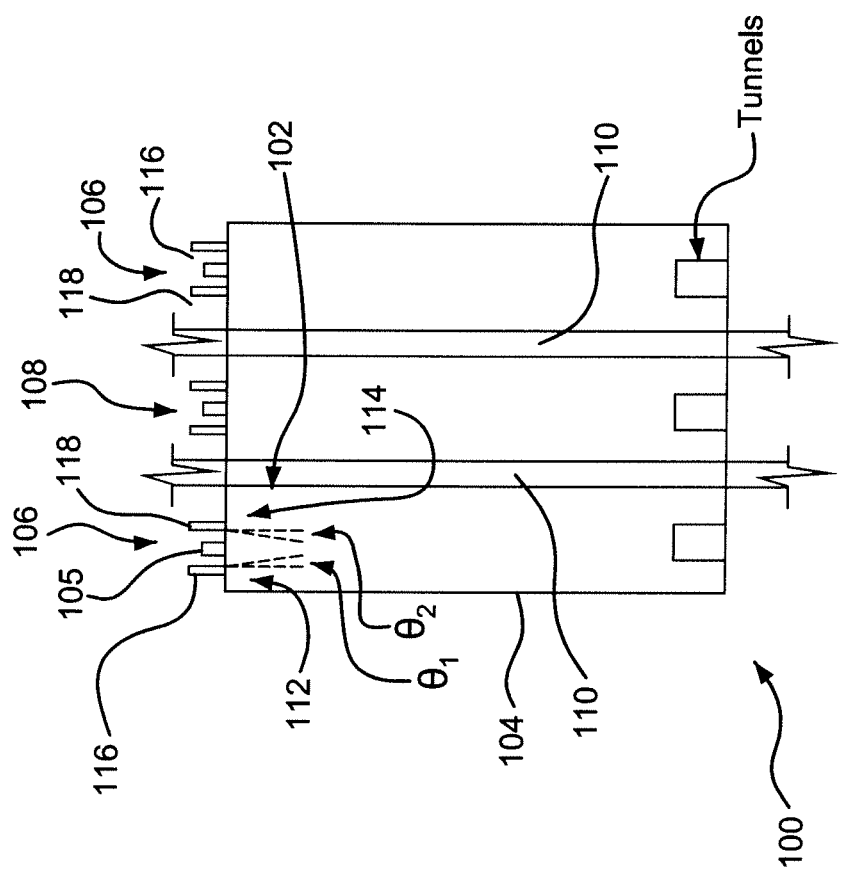
FIG. 1 shows a side schematic view of a reformer according to an exemplary embodiment of the disclosure.

FIG. 1 shows an exemplary reformer 100 for reducing NOx according to an exemplary method of the disclosure. As shown in FIG. 1, the reformer 100 includes a combustion region 102 surrounded by one or more walls 104, a wall-bound burner 106, a non-wall-bound burner 108, and a plurality of process tubes 110. In FIG. 1, the exemplary embodiment of the reformer 100 shows an up-fired configuration where burners are positioned on the floor of the reformer 100. Alternatively, the reformer can include a down-fired configuration having burners placed on the ceiling of the reformer 100. As used herein, the conventionally used terms "up-fired" and "down-fired" refer to a general direction of the flame within the reformer 100 with respect to the vertical wall(s) 104. "Up" and "down" are related to earth's gravity.

The combustion region 102 of the reformer 100 includes non-uniform injection properties formed by the wall-bound burner 106. As used herein, the term "wall-bound burner" refers to a burner positioned proximal to the wall 104 in comparison to at least one other burner, the other burner being a "non-wall-bound burner." In configurations with all burners being positioned proximal to at least one wall 104, the wall-bound burner can be positioned proximal to at least one additional wall 104 as a corner burner or on an end burner. The wall-bound burner 106 can be configured and arranged in a manner different from other burners within reformer 100 to form the non-uniform injection properties. The configuration of the wall-bound burner(s) 106 can include positioning and/or configuring one or more injectors (either one or more of a first set of injectors 116 and/or one or more of a second set of injectors 118) within the wall-bound burners 106. Depending on the configuration of the burners and reformer, first set of injectors 116 and/or the second set of injectors 118 can vary based upon a distance between the wall(s) 104 and/or corners.

The injectors in the wall-bound burner(s) 106 and/or the non-wall-bound burner(s) 108 can provide any suitable fluid for injection into the combustion region 102 to heat the process tubes 110. Suitable fluids can include fluids that can be combusted or can support or control combustion. For example, the injectors can be oxidant injectors and/or fuel injectors. The wall-bound burner 106 and non-wall-bound burner also can include a burner throat 105 centrally located within the burner. The burner throat 105 can provide a primary flow of fuel and/or oxidant for combustion, can be configured for maintaining flame stability, and/or can ignite the fuel provided by one or more of the injectors in the first set of injectors 116 and/or the second set of injectors 118. The burner throat 105 can provide all of the oxidant provided by the burner and a portion of the fuel provided by the burner. Alternatively, the burner throat 105 can provide all of the fuel provided by the burner and a portion of the oxidant provided by the burner. The positioning and/or configuring of the injector(s) positioned around the centrally located burner throat 105 can reduce the amount of NOx produced in the reformer 100 and/or can decrease flame volume in the combustion region 102. The reformer 100 and operation disclosed herein can be applied to any suitable fuel-staged burner(s) and/or air-staged burner(s).

Figure 2:
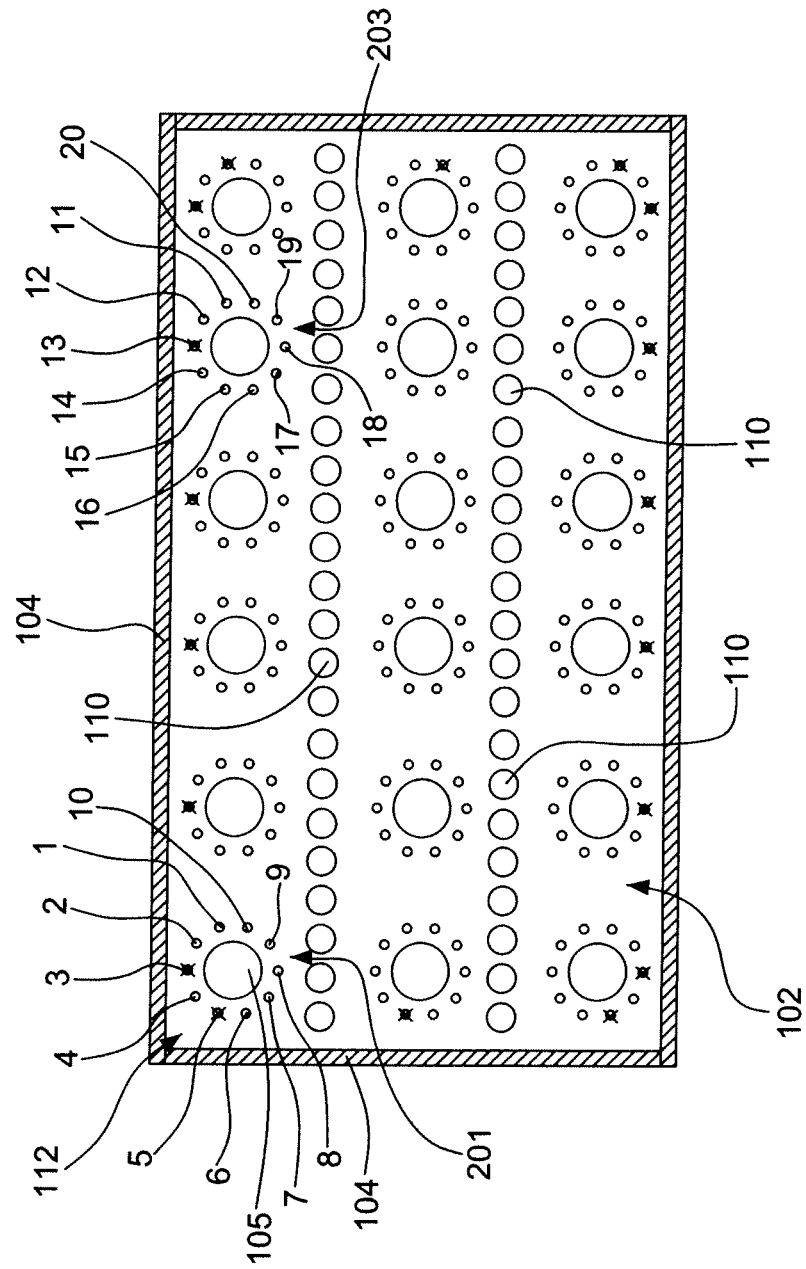
FIG. 2 shows a top schematic view of a reformer according to an exemplary embodiment of the disclosure.

The combustion region 102 is at least partially surrounded by one or more walls 104. As used herein, the term "surrounded" and grammatical variations thereof refers to bordering or enclosing at least one side. The wall(s) 104 can extend around the combustion region 102 in any suitable geometry. For example, as shown in FIG. 2, the wall(s) 104 can extend around the combustion region 102 to form a rectangular perimeter. Alternatively, the wall(s) 104 can extend around the combustion region 102 to form a geometry that is curved, square, rectangular shape, or combination thereof.

The process tubes 110 are positioned within the combustion region 102 of the reformer 100. The process tubes 110 can be any suitable tube for transporting fluids within the reformer 100. The process tubes 110 are heated by combusting fuel in the combustion region 102. The process tubes 110 can be arranged in any suitable arrangement. For example, the process flow direction inside the process tubes 110 can be co-current, counter-current, or a combination thereof (in relation to the direction of firing).

As is depicted in FIG. 1, the process tubes 110 can be arranged in a substantially horizontal row with each process tube 110 extending in a vertical (elevation) direction. The process tubes 110 can have burners positioned on opposing sides. In one embodiment, a row of process tubes 110 is positioned between two substantially parallel rows of burners. As shown in FIG. 1, a row of wall-bound burners 106 can border the wall 104, a row of process tubes 110 can border the row of wall-bound burners 106, a row of non-wall-bound burners 108 can border the process tubes 110 on an opposing side, a second row of process tubes 110 can border the row of non-wall-bound burners 108, and a row of wall-bound burners 106 can border the second row of process tubes 110 and the wall 104 on the opposing side of the combustion region 102. The number of process tubes 110, the number of burners, the distance between process tubes 110 and the burners, the distance between the wall-bound burners 106 and wall 104, the distance between process tubes 110 and wall 104, and/or any other relationship between process tubes 110, the burners, and/or wall 104 can be based upon any suitable arrangement.

In one embodiment, the fraction of wall-bound burners 106 in a multi-row reformer is $2(r+b-2)/b/r$, where r is the number of rows, and b is the number of burners per row. For example, one-third of the burners in a large-scale steam reformer (typically 9-burner rows, 14 burners per row) can be wall-bound burners 106. In a 5-burner-row and 10-burners-per-row medium size steam reformer, 52% of the burners can be wall-bound burners 106.

The wall-bound burner 106, according to the present disclosure, provides the non-uniform injection properties. The non-uniform injection properties generate a heat profile providing a lower amount of heat proximal to the wall(s) 104 in comparison to other regions. In one embodiment, the heat profile can be plotted to show a first region 112 and a second region 114, the first region 112 having a lower fuel-to-oxidant ratio than the second region 114. The first region 112 (being proximal to the wall(s) 104) has a first heat density and the second region 114 (being distal from the wall(s) 104) may has a second heat density. The second heat density is greater than the first heat density.

In the exemplary embodiment shown in FIG. 1, the first region 112 (having the lower fuel concentration) is positioned proximal to the wall 104. Fuel is combusted (or partially combusted) by the wall-bound burner 106 positioned proximal to the wall 104. In this embodiment, the wall-bound burner 106 is substantially different configuration compared to another burner (such as the non-wall-bound burner 108 positioned between the process tubes 110 in the reformer 100 shown in FIG. 1). The substantial difference in configuration forms the non-uniform injection properties. One or more of the injection properties may be different for the wall-bound burner compared to the non-wall-bound burner. The non-uniform injection properties of the wall-bound burner 106 can be formed by injection properties such as a different angle of one or more injectors, a different flow rate of one or more injectors, a different amount and/or location of oxidant injectors, a different amount and/or location of fuel injectors, a different position of one or more injectors, and combinations thereof.

The non-uniform injection properties can be formed by dissimilar fluid injection angles. The non-uniform injection properties can be formed by the first set of injectors 116 and the second set of injectors 118 introducing fluid at different angles. The first set of injectors 116 provides a fluid at a first angle $\theta_1$. The second set of injectors 118 provides a fluid (which may or may not be the same fluid as provided to the first set of injectors 116) at a second angle $\theta_2$. The first angle $\theta_1$ and the second angle $\theta_2$ can differ to form the non-uniform injection properties of the burner 106 positioned as a wall-bound burner. In one embodiment, a range of the first angle $\theta_1$ and the second angle $\theta_2$ can be from about $-30°$ to about $60°$ (where negative angles indicate a divergent, or outward, direction of an axis of the injector relative to an axis of the burner 106). In a further embodiment, the range of the first angle $\theta_1$ can be from about $30°$ to about $45°$ and the range of the second angle $\theta_2$ can be from about $15°$ to about $30°$. In one embodiment, the first angle $\theta_1$ is greater than the second angle $\theta_2$, thereby forming a rapid combustion zone in the first region 112 of the combustion region 102. Increasing the first angle $\theta_1$ can constrict a flame volume, while decreasing the first angle $\theta_1$ can broaden the flame volume.

Figure 3A:
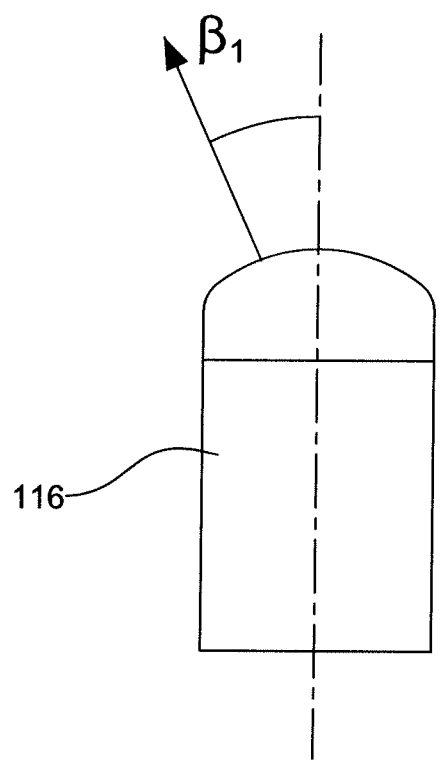
FIG. 3A shows a side schematic view of an injector according to an exemplary embodiment of the disclosure.
Figure 3B:
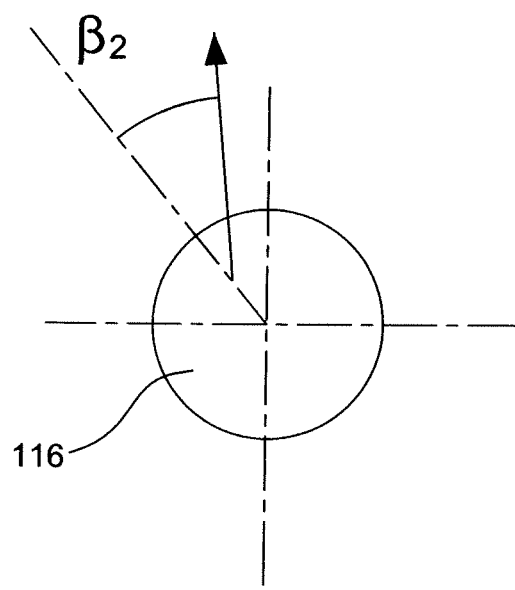
FIG. 3B shows a top schematic view of an injector according to an exemplary embodiment of the disclosure.

In one embodiment, shown in FIGS. 3A and 3B, one or more injector of the first set of injectors 116 can include a compound angle that has both a radial and tangential component. The radial component can be formed by a non-zero radial angle $\beta_1$. The radial component directs the fluid from the first set of injectors 116 toward the axis of the wall-bound burner 106. The fluid from the first set of injectors 116 flows on a path to intersect with the axis of the wall-bound burner 106 at a predetermined downstream location. The tangential component can be formed by a non-zero tangential angle $\beta_2$. The tangential component directs the fluid from the first set of injectors 116 in a direction around the axis of the wall-bound burner 106. For example, if the injection angle is positive (inward), a combined axial component, the radial component, and the tangential component form a helical (or substantially helical) fluid path with a decreasing radius (similar to a shrinking cone) around the axis. The tangential component can prevent the fluid provided by the first set of injectors 116 from intersecting with the axis of the wall-bound burner 106. Thus, the combination of the radial component and the tangential component of a compound angle control a path for the flame generated by the wall-bound burner 106. For example, such compound angles can induce a swirl motion in the flame that can cause desired effects. While larger flame volumes spread out the heat release and lower peak flame temperatures, they can also interfere with adjacent flames or flames in close proximity. To reduce or eliminate the interaction between flames and the wall(s) 104, larger inward injection angles can be desirable.

Referring to FIG. 2, the non-uniform injection properties can be formed by providing controlled flow of fluid to a first fluid flow from one or more of the injectors in the first set of injectors (labeled 1 through 5 in burner 201 and labeled 11 through 15 in burner 203) and a second fluid flow from one or more injectors in a second set of injectors (labeled 6 through 10 in burner 201 and labeled 16 through 20 in burner 203). The first set of injectors can provide a fluid differing in composition from the second set of injectors. For example, in one embodiment, the second fluid flow can include fuel and the first fluid flow can be substantially devoid of fuel or can have a lower fuel-to-oxidant ratio. In this embodiment, the first set of injectors provide the lower fuel-to-oxidant ratio in the first region 112 of the combustion region 102. In a further embodiment, additional sets of injectors can be included.

In one embodiment, the first fluid can include an oxidant and the second fluid can be substantially devoid of the oxidant or can have a different composition of oxidant. In this embodiment, the first set of injectors can provide a higher concentration of the oxidant in the first region 112, thereby forming a lower fuel-to-oxidant ratio in the first region(s) 112.

In one embodiment, the first fluid can be provided at a first flow rate and the second fluid can be provided at a second flow rate, the second flow rate differing from the first flow rate. In this embodiment, the first set of injectors provides a higher concentration of oxidant and/or a lower fuel-to-oxidant ratio in the first region(s) 112, thereby forming a lower fuel-to-oxidant ratio in the first region(s) 112. In a further embodiment, the second flow rate can be zero.

In further embodiments, the non-uniform injection properties can be formed by any suitable combination of configuring wall-bound burner(s) 106. For example, the non-uniform injection properties can be formed by having the first fluid flow from the first set of injectors differ in composition (for example, fuel concentration and/or oxidant concentration) from the second fluid flow from the second set of injectors. Additionally or alternatively, the non-uniform injection properties can be formed by configuring wall-bound burner(s) 106 by having the first fluid flow from the first set of injectors differ in flow rate from the second fluid flow from the second set of injectors. Additionally or alternatively, the non-uniform injection properties can be formed by configuring wall-bound burner(s) 106 to introduce the first fluid flow from the first set of injectors at an angle differing from the second fluid flow from the second set of injectors. Additionally or alternatively, the non-uniform injection properties can be formed by any other suitable configuration for wall-bound burner(s) 106 and/or set(s) of injectors.

The arrangement of wall-bound burner(s) 106 and/or the set(s) of injectors can include any suitable arrangement forming the non-uniform injection properties. The non-uniform injection properties can be formed by including fewer injectors in the wall-bound burner 106, by arranging the wall-bound burner 106 such that none of the included injectors are along the wall 104, and/or by rotating the wall-bound burner 106. The rotating of the wall-bound burner 106 can orient injectors within the wall-bound burner 106 to be dissimilar from an orientation of injectors for the non-wall-bound burner 108. Additionally, the rotated wall-bound burner 106 can include two injectors being equidistant (or substantially equidistant) from the wall 104, whereas other burners (for example, burner 201) have one injector (labeled 3) being closer to the wall 104 than any other injector.

EXAMPLE

A computational fluid dynamic (CFD) models was generated. The CFD model was based upon a reformer having multiple burners, some being wall-bound burners. The wall-bound burners have less combustion space than the other burners in the furnace.

A reformer furnace was utilized with multiple rows of process tubes. Fuel injectors were removed from the wall-bound burners adjacent to a wall for a multiple process row reformer.

In the example, injector 13 (as shown in burner 203 of FIG. 2) was disabled resulting in zero flow. Injector 3 and injector 5 (as shown in burner 201 of FIG. 2) were disabled resulting in zero flow. The modification was intended to reduce furnace scale instability caused by burner-to-burner flame interaction. Such flame interaction can be measured by flame volume relative to furnace volume. The flame volume, as used in this example, is defined as regions of carbon monoxide (CO) level having at least 1000 parts per million on a wet molar basis (ppm wet). For a reformer having nine burner rows and 14 burners in each row, there is a predicted 8% reduction in flame volume despite only affecting approximately 3% of the total fuel input.

While the method and/or furnace have been described with reference to a preferred embodiment, it will be understood by those skilled in the art that various changes may be made and equivalents may be substituted for elements thereof without departing from the scope of the invention as defined by the attached claims. In addition, many modifications may be made to adapt a particular situation or material to the teachings of the disclosure without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of combustion, the method comprising:
  combusting a fuel in a combustion region of an up-fired or down-fired reformer, the combustion region being at least partially surrounded by one or more walls, the combusting being performed by a plurality of burners, wherein at least one of the plurality of burners is a wall-bound burner comprising a plurality of injectors and at least one of the plurality of burners is a non-wall-bound burner comprising a plurality of injectors; and forming non-uniform injection properties with the wall-bound burner, the non-uniform injection properties generating a heat profile, the heat profile providing a first heat density proximal to the one or more walls and a second heat density distal from the one or more walls, the second heat density being greater than the first heat density;

wherein one or more injection properties of the wall-bound burner are different from one or more injection properties of the non-wall-bound burner, and wherein the non-uniform injection properties of the wall-bound burner are formed by the one or more injection properties of the wall-bound burner, the one or more injection properties of the wall-bound burner and the non-wall-bound burner being selected from the group consisting of an angle of one or more injectors of the plurality of injectors of the wall-bound burner and the non-wall-bound burner, a flow through one or more injectors of the plurality of injectors of the wall-bound burner and the non-wall-bound burner, an amount and/or location of oxidant injectors, the plurality of injectors of the wall-bound burner and the non-wall-bound burner comprising the oxidant injectors, an amount and/or location of fuel injectors, the plurality of injectors of the wall-bound burner and the non-wall-bound burner comprising the fuel injectors, and combinations thereof.

2. The method of claim 1, wherein the plurality of injectors of the wall-bound burner comprises a first set of injectors and a second set of injectors, wherein the non-uniform injection properties are formed by the flow through one or more injectors of the first set of injectors and the second set of injectors of the wall-bound burner, the flow through the one or more injectors comprising a first fluid flow from the first set of injectors of the wall-bound burner and a second fluid flow from the second set of injectors of the wall-bound burner, the first set of injectors being proximal to the one or more walls and the second set of injectors being distal from the one or more walls.

3. The method of claim 2, wherein the first fluid flow differs from the second fluid flow by composition.

4. The method of claim 3, wherein the first fluid flow comprises a fuel.

5. The method of claim 4, wherein the first fluid flow has a first fuel-to-oxidant ratio and the second fluid flow has a second fuel-to-oxidant ratio, the first fuel-to-oxidant ratio being less than the second fuel-to-oxidant ratio.

6. The method of claim 3, wherein the first fluid flow comprises an oxidant.

7. The method of claim 6, wherein the first fluid flow includes a lower fuel-to-oxidant ratio than the second fluid flow.

8. The method of claim 2, wherein the first fluid flow has a first flow rate and the second fluid flow has a second flow rate, the first flow rate being different from the second flow rate.

9. The method of claim 8, wherein the first flow rate is zero.

10. The method of claim 1, wherein the plurality of injectors of the wall-bound burner comprises a first set of injectors and a second set of injectors, wherein the non-uniform injection properties are formed by the angle of one or more injectors, of the first set of injectors and the second set of injectors of the wall-bound burner, the angle of the one or more injectors comprising a first injector angle for the first set of injectors and a second injector angle for the second set of injectors, the first injector angle being different from the second injector angle.

11. The method of claim 1, wherein the plurality of burners are arranged in a plurality of rows.

12. The method of claim 1, wherein the plurality of injectors of the wall-bound burner comprises oxidant injectors and the plurality of injectors of the non-wall-bound burner comprises oxidant injectors, and wherein the amount of oxidant injectors in the wall-bound burner differs from a second amount of oxidant injectors in the non-wall-bound burner.

13. The method of claim 1, wherein the plurality of injectors of the wall-bound burner comprises fuel injectors and the plurality of injectors of the non-wall-bound burner comprises fuel injectors, and wherein the amount of fuel injectors in the wall-bound burner differs from a second amount of fuel injectors in the non-wall-bound burner.

* * * * *